United States Patent [19]

Smets et al.

[11] Patent Number: 4,757,380

[45] Date of Patent: Jul. 12, 1988

[54] METHOD OF CAUSING AN OBSERVER TO GET A THREE-DIMENSIONAL IMPRESSION FROM A TWO-DIMENSIONAL REPRESENTATION

[75] Inventors: Gerda J. F. Smets, The Hague; Michael H. Stratman, Delft, both of Netherlands; Cornelis J. Overbeeke, Louvain, Belgium

[73] Assignee: Technische Hogeschool Delft, Delft, Netherlands

[21] Appl. No.: 886,690

[22] Filed: Jul. 18, 1986

[51] Int. Cl.$^4$ .................................. H04N 13/00
[52] U.S. Cl. ........................... 358/88; 358/93; 358/3
[58] Field of Search ............. 358/3, 88, 104, 227, 358/183, 22, 93; 350/130, 131; 352/57; 353/7; 354/112, 114

[56] References Cited

U.S. PATENT DOCUMENTS

| | | | |
|---|---|---|---|
| 3,720,007 | 3/1973 | McKechnie et al. | 35/12 N |
| 3,862,358 | 1/1975 | Wolff | 358/104 |
| 4,048,653 | 9/1977 | Spooner | 353/104 |
| 4,303,394 | 12/1981 | Berke | 434/40 |
| 4,574,314 | 3/1986 | Weinblatt | 358/227 |

FOREIGN PATENT DOCUMENTS 1119557  7/1968  United Kingdom .

OTHER PUBLICATIONS

T. Niina et al., *Proceedings of the SID*, vol. 23/2, pp. 73–80 (1982).
G. J. F. Smets et al., *Perceptual and Motor Skills*, 64:1023–1034 (1987).
Oshima et al., *Applied Optics*, 18(4):469–476 (1979).
Pepper, *Proceedings of the SID*, 24(1):73–80 (1983).
Rogers et al., *Vision Res. GB*, 22(2):261–270 (1982).

*Primary Examiner*—James J. Groody
*Assistant Examiner*—Michael D. Parker
*Attorney, Agent, or Firm*—Bernard, Rothwell & Brown, P.C.

[57] ABSTRACT

A method of causing an observer to get an three-dimensional impression of a scene from a two-dimensional representation thereof is disclosed. The observers movements, in particular the movements of his head and/or eyes are monitored and means are provided by which, depending on these movements, two-dimensional representations uniquely associated with each position of the head and/or eyes are displayed on a screen. According to the invention, the display means represent the relative parallactic displacements between all the objects in the scene relative to a predetermined fixation point in the scene.

6 Claims, 3 Drawing Sheets

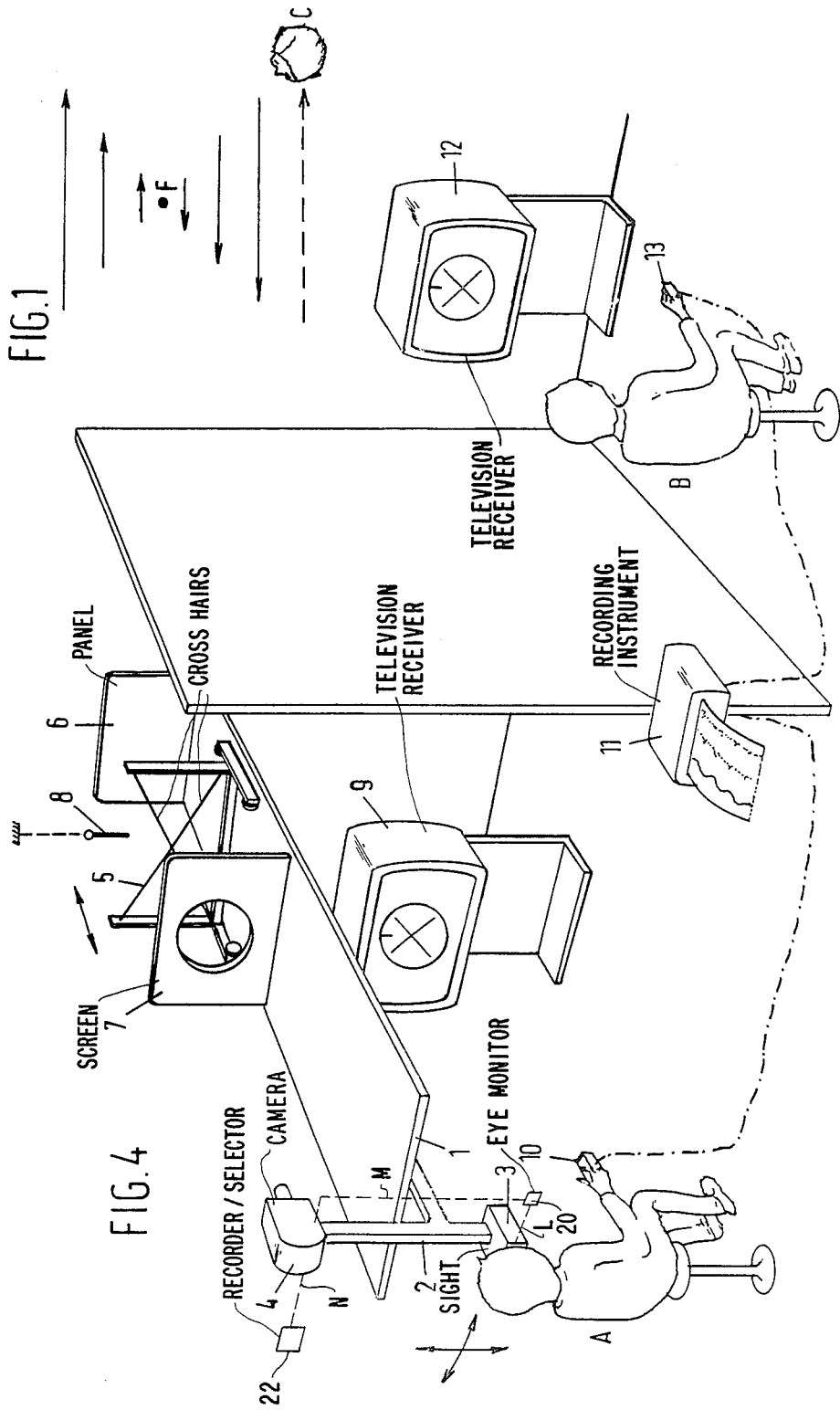

METHOD OF CAUSING AN OBSERVER TO GET A THREE-DIMENSIONAL IMPRESSION FROM A TWO-DIMENSIONAL REPRESENTATION

BACKGROUND OF THE INVENTION

1. Field of the Invention

This invention relates to a method of causing an observer to get a three-dimensional impression of a scene from a two-dimensional representation thereof, in which the observer's movements are monitored and means are provided by which, depending on these movements, two-dimensional representations uniquely associated with each body position of the observer are displayed on a screen.

Description of the Related Art

A similar method is known for training a driver by means of visual simulation to manoeuvre a vehicle correctly to a pre-determined position. According to the known prior method, part of the portion of the vehicle which the driver has in view during manoeuvring is recorded by means of a first camera. This portion may be of both two-dimensional and three-dimensional design. By means of a second camera, a picture is taken of a three-dimensional design of a scene representing surroundings with the position into which the vehicle is to be manoeuvred. The images from the first and second cameras are combined and supplied to a projector, which projects this combined image onto a screen. The combination of the two images is so effected that movements of the driver result in such changes in the reproduction of the image of the first camera in the projected image that it seems as if the driver is actually within or on the vehicle. At the same time, in depicting the image of the second camera, the commands given by the driver for manoeuvring the vehicle to the pre-determined position are taken into account.

It is true that the prior method permits making good distance estimates between, for example, the leading edge of the vehicle and the position into which it must be manoeuvred, but it is not possible to accurately estimate the depth between the various objects present in the scene recorded by the second camera.

The wish of having two-dimensional pictures on a projection screen or on a display screen create a three-dimensional impression with an observer has existed for quite some time. To realize this, various solutions have been proposed, which each have their own specific disadvantages.

According to a first solution principle, use is made of the so-called binocular disparity. As a human being has two eyes, whose pupils are, on average, 6.5 cm apart, the left-hand retinal image is not exactly equal to the right-hand retinal image. When an object is viewed, the two retinal images together give a three-dimensional picture of the object, with the depth observed corresponding to the degree of disparity.

Most of the three-dimensional image systems are based on the presentation of a separate left-hand and right-hand image, which images are combined to form one spatial image. This combination can be effected either by means of special glasses, such as stereoscopic, anaglyphic, polarisation, or light ports glasses, or in the image proper by means of a stereoscopic lens system arranged on the screen.

In all these solutions based on binocular disparity, a moderate to fair depth impression is formed, but the observer often gets an annoying headache after some time. Moreover, either special glasses are required or an expensive adaptation of the imaging system.

A second solution principle, the so-called triangle system, is based on the fact that the convergence of our eyes gives us distance information. The depth impression obtained by means of this principle is rather weak, while in addition special glasses are required.

A third solution principle is based on the formation of a virtual volume. There are two distinct systems, namely, the varifocal mirror system and holography, in which a virtual three-dimensional image is formed in different manners.

In a varifocal mirror system this is effected by projecting a two-dimensional image on an accurately controlled vibrating mirror. An image which on a normal mirror would be a circle becomes a tube on such a vibrating mirror. The image gets a virtual added dimension.

In holography the virtual volume is formed by recording optical interference patterns on a special photographic plate which, with suitable lighting, also give the impression of a virtual volume.

As the technical procedures in both the varifocal mirror system and holography are rather complicated, it has hitherto to only being possible to use these for depicting non-moving objects or scenes. Both systems do produce a good depth impression.

All of the methods described above, in which a good three-dimensional impression is obtained from a twodimensional image are limited either owing to the fact that the realisation of the system is expensive, or because a reproduction of still pictures is possible only. The simpler systems, such as the anaglyphic system, which can also be used in television broadcasts, only a moderate depth effect is obtained, while the viewer must wear special glasses of different colors, and will get a headache after a short time. In addition color reproduction is difficult, and there is only a depth effect from one point of view.

SUMMARY OF THE INVENTION

It is an object of the present invention to provide a method which does not have any of the disadvantages mentioned above, and in which, specifically, a very good three-dimensional impression is obtained from a two-dimensional image which is formed either on a projection screen or on a display screen, and for which little extra expenditure needs to be incurred.

For this purpose the invention provides generally a method in which the display means represent the relative parallactic displacement between all of the objects in the scene relative to a pre-determined fixation point in the scene.

More specifically the invention provides a method in which the movements of the observer's head are monitored.

BRIEF DESCRIPTION OF THE DRAWINGS

The invention as compared to some previously known methods of preception will now be described in more detail with reference to the accompanying drawings, in which:

FIG. 1 diagrammatically shows the principle of parallax shift;

FIG. 4 diagrammatically shows an experimental set-up; and

DESCRIPTION OF THE PREFERRED EMBODIMENTS

Figures 2, 3:
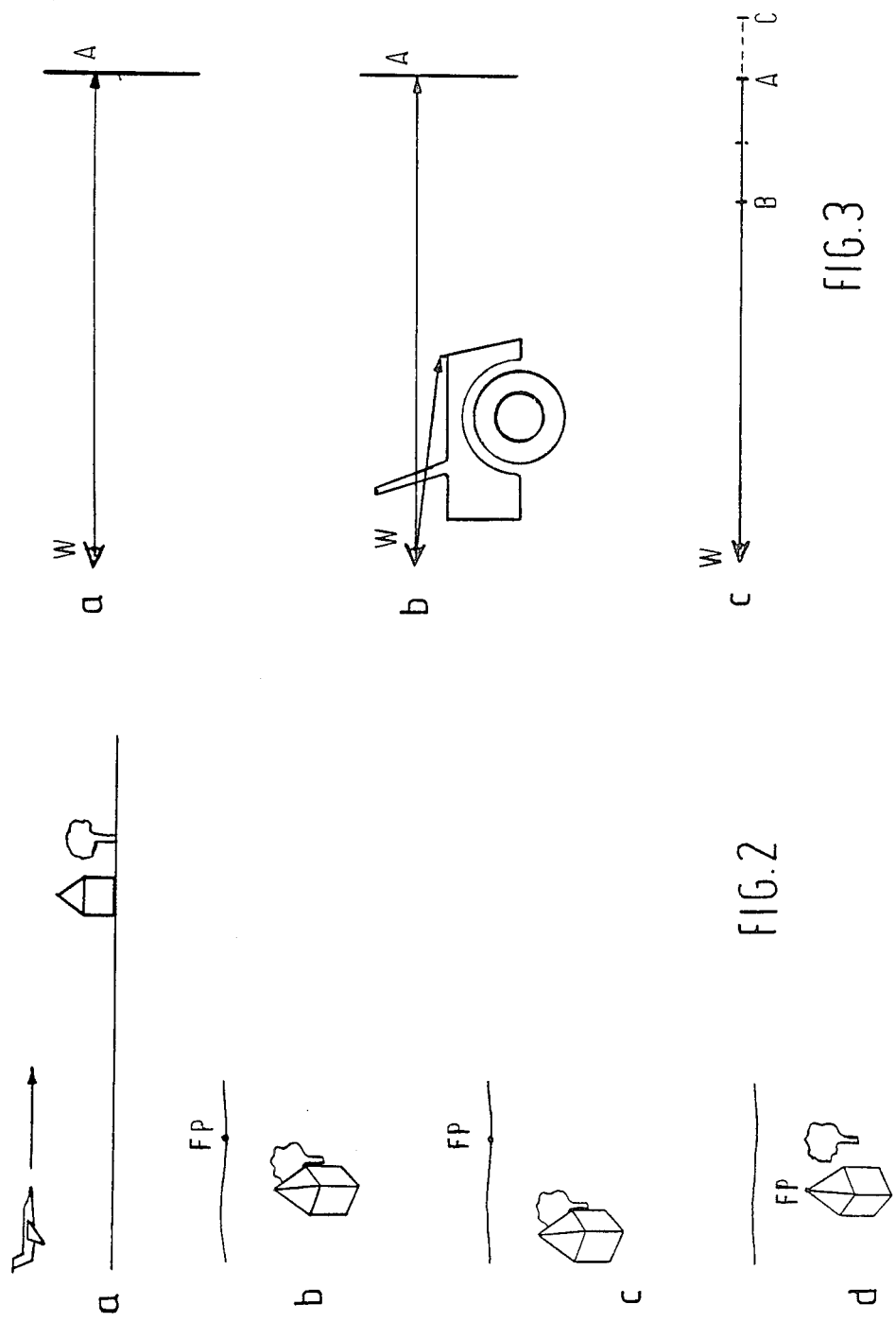
FIG. 2a–d diagrammatically show the difference in perception at a fixation point in the infinity and a proximal fixation point.
FIG. 3a–c show diagrammatically the difference between the estimation of distance and depth.

The invention is based exclusively on the principle which is called motion parallax. This principle is elucidated with reference to FIG. 1. When an observer C moves his head to the right in a plane parallel to a scene, and fixes the point F, the objects in front of the fixation point F appear to move to the left, and objects behind the fixation point to the right. When the observer moves his head to the left, the situation is the other way round. In these movements, not only can directions be distinguished, but also velocities and accelerations. The changes in the field of view maintain systematic relations to the distance of the observer and the objects from the point of fixation.

According to the invention, it has been found that, with a unique relationship between the movements of the observer's head around a point of fixation, on the one hand, which point of fixation can be freely determined, and the two-dimensional displacements in a scene around said point of fixation, represented on a display screen or projection screen, on the other, a very good threedimensional picture of the scene is obtained. Even when the picture is viewed with one eye is a three-dimensional impression obtained.

In contrast to the optical systems of the prior art, the present invention exclusively uses motion parallax for creating a depth impression. As compared with the prior systems, the method of the present invention provides a less expensive and qualitatively better possibility of creating a three-dimensional impression of a two-dimensional image. In contrast to the systems based on binocular disparity, the method according to this invention also permits of monocular applications. Better results are obtained than with systems based on convergence, and displaying moving images is possible, which is not the case, for example, with holography. In addition, color reproduction is no problem whatsoever.

The projection of two-dimensional images, or their display on a television screen requires at least two, but preferably several images viewed from different angles. The observer selects the image shown by his movements.

It is noted that a large number of methods are known for visual simulation for training pilots. With regard to the present invention, U.S. Pat. No. 4,048,653 appears to be the most relevant in this connection. This patent relates to a method in which a trainee pilot is seated in a model of a real cockpit, that is to say, in surroundings with real instruments and real airplane windows, and in which, by means of a complicated lens system, there is simultaneously formed for him an image of the interior of the cockpit and of the surroundings which the pilot would actually see outside the cockpit. This image of the surroundings consists of a picture of the surroundings in which the airplane is supposed to be, which is projected on a screen by means of a projector, and which image is obtained by viewing a scale model of the surroundings by means of a camera, and movements of the airplane under the influence of the pilot's commands result in corresponding movements of the camera, as a result of which the airplane appears to move relatively to the surroundings.

The difference with the method according to the present invention is that, to a pilot, the visual scene is commonly infinitely distant. He is concerned with the shift of his cockpit windows relative to a visual scene which, owing to being far away, can be regarded as one plane. The pilot needs to be able to position his airplane relative to the horizon and has no need of being able to estimate depth. This is accompanied by the effect of perspective transformation. FIG. 2a shows the situation being simulated. FIG. 2b shows the image which the pilot views in the situation outlined, and FIG. 2c shows how the image which the pilot views is changed when he moves his head to the right. In the situation shown in FIGS. 2b and 2c, the point of fixation FP is in inifinity. FIG. 2d shows the image which the pilot would see when he would move his head to the right using the method according to the present invention, in which the point of fixation is not in infinity.

Accordingly, the method according to the present invention is directed not to the possibility of distance judging, e.g. juding the distance of an airplane from the ground, but towards creating a convincing spatial impression and the possibility of making accurate depth estimates. The visual scene is not a plane but a space. In such a situation the parallactic relative displacements between all objects in function of the point of fixation play a major role in the depth estimates.

FIG. 3 illustrates in a different manner the difference between distance judging and depth estimation. FIG. 3a shows the absolute distance of an observer W from a point A located in a given scene. FIG. 3b shows the way in which, in the prior art, in which an image of a scene is combined with an image of the part of a vehicle sighted by a driver, an accurate estimation of the distance between the observer and point A is possible. FIG. 3c, finally, shows what is understood by depth estimation. In this case it is desirable for the observer W to estimate that the distance A-C is half the distance A-B, in which, for example, point A is the point of fixation, but any other point of the scene can be selected as the point of fixation, too.

The method according to the invention can be realized in a very large number of ways. Thus the head movements may be directly coupled to the movements of, e.g., a television camera, but this coupling can also be effected by means of infrared or ultrasonorous transmission, by causing a transmitter to transmit signals representative of the movements of the observer's head to a receiver, which converts these movements into camera motion commands.

A number of methods of monitoring the movements of an observer's head and converting these into signals suitable for controlling, for example, a camera, are already known to those skilled in the art.

The three-dimensional observations can take place in a real-time situation, but also afterwards by recording the two-dimensional images to be viewed on, for example, two or more film strips or on a plurality of slides, in which case two or more film or slide projectors are required during observations, which depending on the position of the observer's head reproduce a particular image of the scene, viewed from an angle corresponding to this position of the observer's head. The images can also be recorded on a video disc, in which case only one video disc player and one television set are required, and, depending on the position of the observer's head, one particular image recorded on the video disc is displayed on the television screen.

Three-dimensional television viewing requires transmitting a plurality of images at the same time. The viewer's movements determine which image is displayed on the screen.

The method according to the present invention is of particular importance for engineering and medical applications. In these, a direct coupling is possible between the observer's movements and the movements of a video camera. Only one camera and one monitor are required.

By means of an adaptation of the conventional cameras for endoscopy for example, three-dimensional images of body cavities can be obtained. This facilitates examination and possible surgical operations. The three-dimensional viewing of two-dimensional X-ray images is also simplified by this method.

The examination of spaces which are difficult of access is facilitated because the three-dimensional control of robot arms or unmanned vehicles in such spaces, such as those which are inaccessible to human beings in connection with explosion or radiation hazards, is greatly simplified. The same applies to aviation and space travel applications, Computer Aided Design (CAD) applications, and in guarding objects.

The method according to the invention already gives very good results when it is only the movements of the observer's head which determine which image is displayed. A further refinement of the three-dimensional impression can be obtained by also monitoring the eye movements of the observer and having these together with the head movements determine which image is projected or displayed, or from what position a camera views the scene. For monitoring the eye movements of an observer several methods are known to those skilled in the art as well.

In most cases the observer will be a person, but it is also possible to have a three-dimensional impression of an image viewed by a viewing robot, as a result of which the work to be performed by this robot can be carried out more accurately. The method according to the invention gives very good results when the head and/or eye movements of the observer are monitored. After a learning process, however, it is also possible for an observer to keep his head and eyes still and yet obtain a three-dimensional impression by making a selection from a plurality of images of a scene by means, for example, of the observer's hand movements, in which arrangement each image is again uniquely coupled to the position of the observer's hand. As the hand movements are controlled by the observer's brains, thanks to the learning process the same impression of the scene can be obtained as by moving the head and/or eyes.

We will now describe the results of the application of the method according to the invention in an experimental set-up.

FIG. 4 diagrammatically shows the experimental set-up; and

FIGS. 5a–d show some diagrams of measurement results obtained.

FIG. 4 shows an observer A who, by means of the method according to the invention, gets a three-dimensional impression of a scene displayed on a television screen in two dimensions, and an observer B who can only observe two-dimensional images on a television screen.

In the experimental set-up, mounted for movement on a platform 1 is an arm 2 carrying a sight 3 at the lower end and a television camera 4 at its upper end. The head of observer A rests against sight 3, which is a hollow tube, so that head movements of the observer to the left or to the right and upwards or downwards immediately result in corresponding movements of camera 4. Mounted on platform 1 is a panel 6 which forms a background for the scene viewed by camera 4 and a screen 7 with an aperture therein. Mounted for rectilinear movement forwards and backwards between screen 7 and panel 6 are cross hairs 5. Arranged in a fixed position above cross hairs 5 is a rod 8 serving as a reference point.

Through sight 3, which is just an empty tube, observer A views the screen of a television receiver 9, on which the scene viewed by camera 4 is displayed. Observer A is instructed to press a button 10 at the moment he thinks that the cross hairs 5 are exactly under reference rod 8. The movement of the cross hairs and the signals given by observer A are recorded by a recording instrument 11. During viewing, observer A can estimate the position of the cross hairs relative to the reference rod by moving his head to and fro, as a result of which camera 4 moves correspondingly, and hence two-dimensional images are displayed on screen 9, viewed from different positions. Additionally, eye movements of the observer can be monitored, as indicated by phantom line L, by monitor 20, shown schematically in FIG. 4, connected to camera 4 by phantom line M to display images that are uniquely associated with both the position of the head and the position of eye or eyes.

If desired, the images obtained by camera 4 can be recorded and stored in digital form by recorder/selector 22, shown schematically in FIG. 4 connected to camera 4 by phantom line N. and the recorded images can be utilized to provide an impression of depth perception based on an observer's movement.

This same two-dimensional image is also displayed on the screen of a television receiver 12 viewed by observer B. Observer B also has to press a button 13 at the moment he thinks that the cross wires 5 are exacly under reference rod 8. The signal from this button is also recorded by instrument 11. The head movements of observer B are of course in no way related to the movements of camera 4 and observer B also cannot either see or hear when observer A presses his button.

Figure 5:
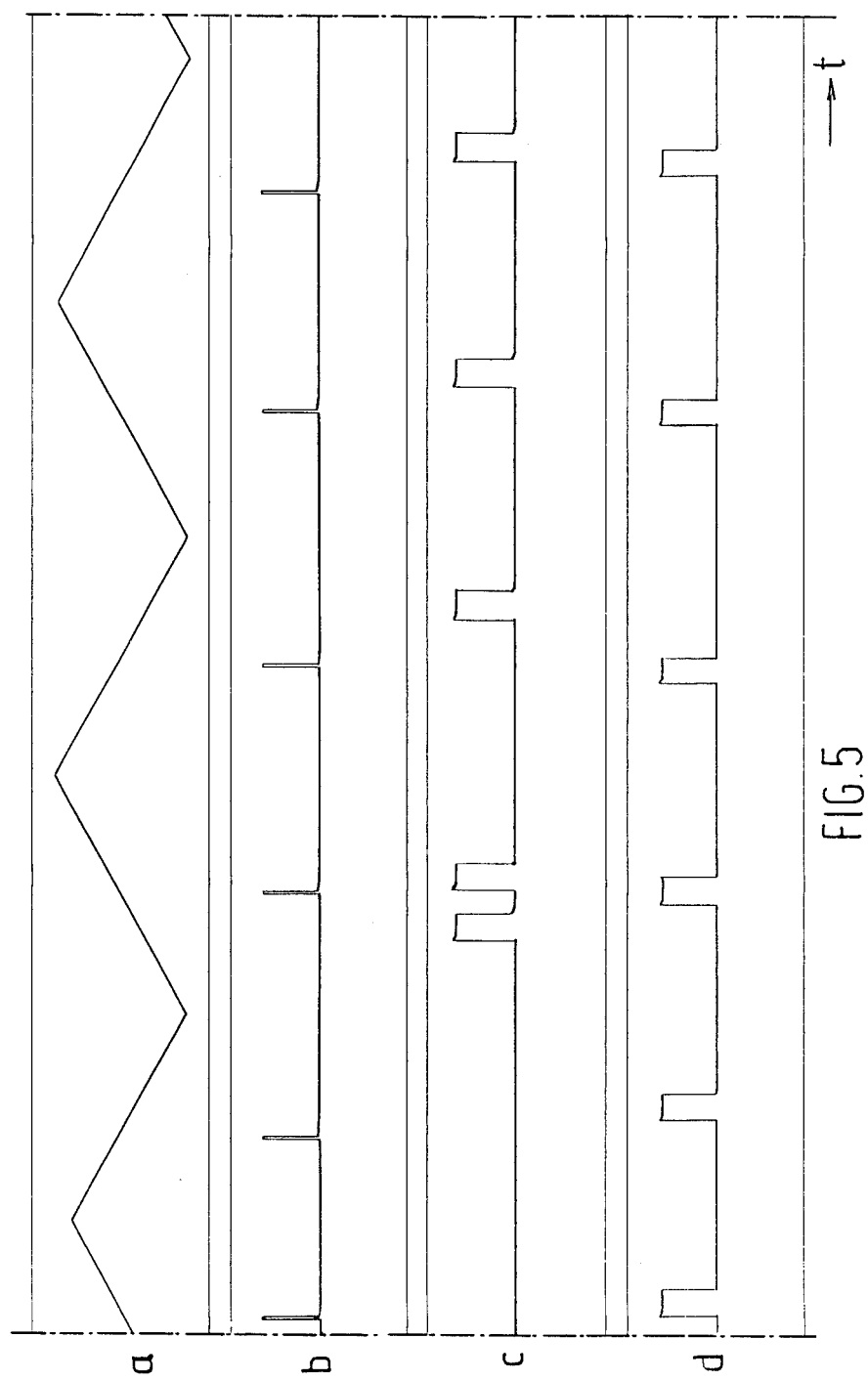
FIG. 5a–d show some diagrams of measurement results obtained.

In FIG. 5 the time is plotted along the horizontal axis, and FIG. 5a illustrates the forward and backward movements of cross hairs 5. FIG. 5b shows a number of pulses indicating the moments when cross hairs 5 were exactly under reference rod 8. FIG. 5c shows the signals given by observer B and FIG. 5d the signals of observer A.

FIG. 5 shows that the judgements of observer A, who gets a three-dimensional impression from the two-dimensional images on the television screen in accordance with the present invention, as to the relative positions of cross hairs 5 and reference rod 8 are considerably more accurate than those of observer B, who exclusively observes two-dimensional images.

By means of a prolonged investigation using the above experimental set-up, it has been established that a very good three-dimensional impression of two-dimensional images of a scene can be obtained by the method according to the present invention without this requiring major investments.

The number of possible applications of the method according to the invention is of course extremely large, and the examples given hereinbefore only serve to illustrate some of such uses and are not intended to form a limitative enumeration in any way.

We claim

1. A method of causing an observer to get a three-dimensional impression of a three-dimensional scene from a two-dimensional representation of that scene, including the steps of monitoring the observer's movements and, depending on these movements, displaying on a screen two-dimensional representations uniquely associated with each body position of the observer, further including the steps of selecting and displaying one from a plurality of two-dimensional images of the entire scene, as a function of the observer's movements relative to one predetermined and coinciding fixation point in the scene, thereby displaying the relative parallactic displacement between all the objects in the scene relative to the coinciding fixation point in the scene.

2. A method as claimed in claim 1, further including the step of monitoring the movements of the observer's head.

3. A method as claimed in claim 2, further including the steps of monitoring movement of at least one eye of the observer and displaying two-dimensional representations uniquely associated with both the position of the head and the position of as said at least one eye of the observer.

4. A method as in claims 1, 2, or 3, further including the step of utilizing a one image pick-up apparatus that is moved around the coinciding fixation point to pick-up images of the scene in real time in synchronization with the observer's movements.

5. A method as claimed in claims 1, 2 or 3, characterized in that the images of the scene are prerecorded.

6. A method as claimed in claim 5, characterized in that the images are prerecorded in digital form.

* * * * *

UNITED STATES PATENT AND TRADEMARK OFFICE
CERTIFICATE OF CORRECTION

PATENT NO. : 4,757,380

DATED : July 12, 1988

INVENTOR(S) : GERDA J.F. SMETS, ET AL.

It is certified that error appears in the above-identified patent and that said Letters Patent is hereby corrected as shown below:

Column 8, line 10, in Claim 3, "as" should be deleted after "position of".

Signed and Sealed this

Twelfth Day of December, 1989

Attest:

JEFFREY M. SAMUELS

*Attesting Officer*    Acting Commissioner of Patents and Trademarks